United States Patent Office 3,426,627
Patented Feb. 11, 1969

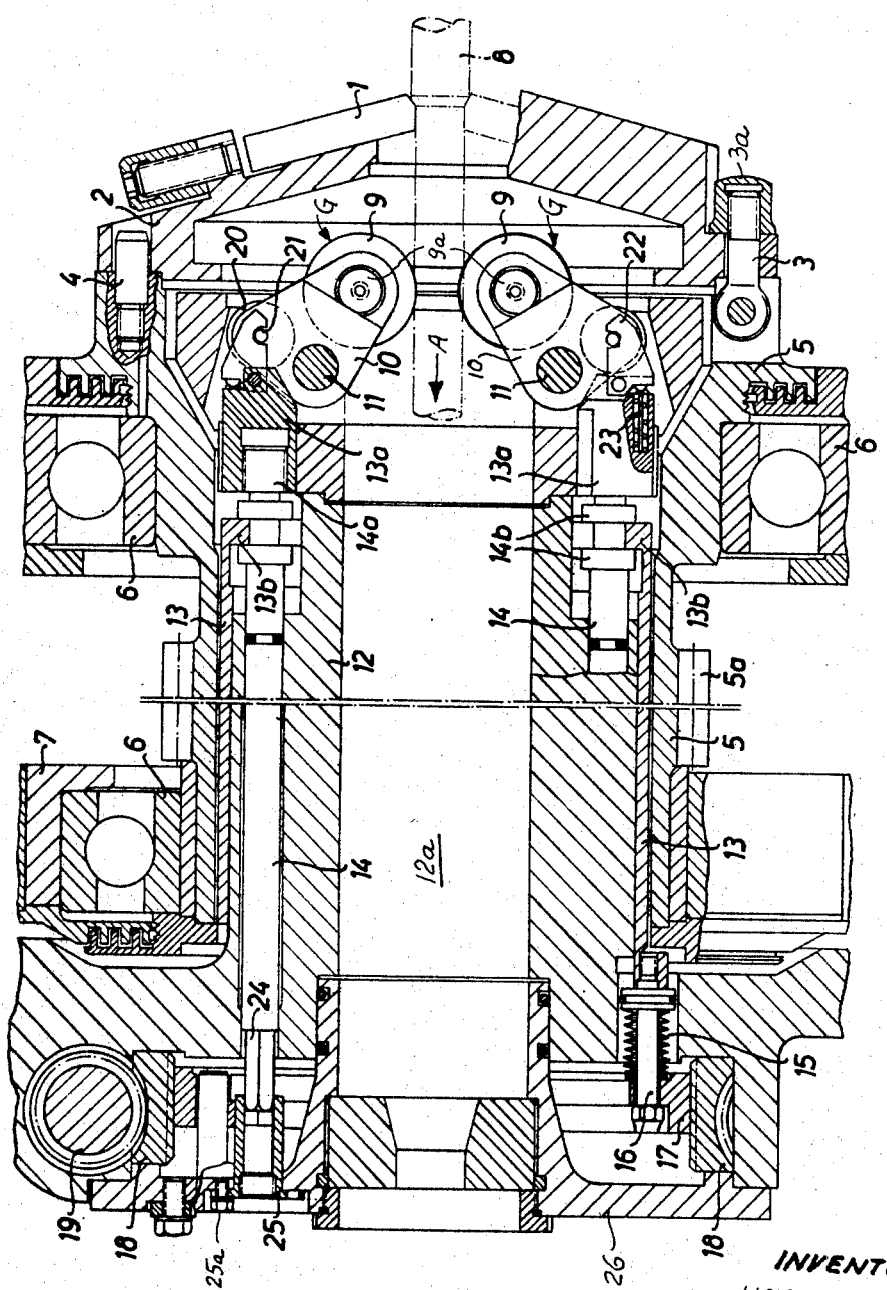

3,426,627
APPARATUS FOR GUIDING WORKPIECES IN MATERIAL REMOVING MACHINES
Horst Lorenz, Solingen, Germany, assignor to Th. Kieserling & Albrecht Werkgeugmaschinenfabrik, Solingen, Germany
Filed Mar. 14, 1966, Ser. No. 534,127
Claims priority, application Germany, Apr. 24, 1965, K 55,912
U.S. Cl. 82—20
Int. Cl. B23b 5/00, 25/00
12 Claims

ABSTRACT OF THE DISCLOSURE

A material removing machine, particularly a machine for shaving the exterior of elongated workpieces which travel lengthwise, in which a plurality of guide members are mounted on a stationary support movable toward and away from the periphery of the travelling workpiece and in which first adjusting means cooperate with the guide members for moving all of the same simultaneously and in the same direction relative to the stationary support, and second adjusting means permit to individually move the guide members relative to each other and the support.

---

The present invention relates to machine tools in general, and more particularly to improvements in apparatus for guiding tubes, solid rods and similar elongated workpieces in machines which remove material from the exterior of such workpieces. Still more particularly, the invention relates to an apparatus which is especially suited to guide and support workpieces which move lengthwise through the tool holder of a rotary shaving machine.

In machines which shave the exterior of metallic rods, pipes and similar elongated workpieces of circular cross section, the work must be supported upstream and/or downstream of the actual shaving or material removing station. Conventional apparatus which are utilized to guide the workpieces during shaving normally comprise a set of rolls or jaws (hereinafter called guide members) which are movable as a unit, either toward or away from the periphery of a workpiece which moves lengthwise. A serious drawback of such known apparatus is that the wear on their guide members is seldom uniform so that it happens quite frequently that one or more guide members are not in actual contact with the workpiece.

Accordingly, it is an important object of the present invention to provide an apparatus for guiding elongated workpieces in shaving and analogous material removing machines and to construct and assemble the apparatus in such a way that its guide members may be adjusted simultaneously or individually so that each such guide member can be invariably placed in contact with a moving workpiece regardless of the wear on its work-engaging surface or surfaces and regardless of inaccuracies in the finish of guide members.

Another object of the invention is to provide the improved apparatus with very simple and readily manipulable adjusting units which can effect simultaneous or individual adjustments of guide members.

A further object of the invention is to provide an apparatus which can be used with particular advantage to guide and support a workpiece in a zone located downstream of the material removing station.

An additional object of the invention is to provide an adjusting apparatus which can be readily incorporated in presently known shaving and analogous material removing machines.

A concomitant object of the invention is to provide an apparatus for guiding pipes, rods and similar elongated workpieces in shaving and like material removing machines and to construct the apparatus in such a way that its guide members may be put to repeated use for long periods of time despite the fact that their work-engaging surfaces might be subjected to different degrees of wear.

Briefly stated, one feature of the present invention resides in the provision of an apparatus which is utilized for guiding and supporting elongated workpieces in shaving or other material removing machines. In its simplest form, the apparatus comprises a preferably tubular support defining a central passage in which a workpiece can move lengthwise, a plurality of guide members mounted on the support and movable toward or away from the center of the passage to respectively engage or move away from the periphery of the workpiece (the guide members preferably comprise guide rolls and are preferably rockable about pivot axes which are normal to and cross in space the axis of the workpiece), first adjusting means for simultaneously moving all of the guide members with reference to the support, and second adjusting means for individually moving the guide members with reference to each other and with reference to the support.

In setting up the improved apparatus for use in a shaving machine, the operator will manipulate the first adjusting means to see whether or not all of the guide members actually engage the workpiece. If one or more guide members fail to engage the workpiece but at least one guide member does, the operator manipulates the corresponding component or components of the second adjusting means to place the respective guide members in optimum position of engagement with the workpiece. If the machine is thereupon converted for treatment of differently dimensioned workpieces, the operator simply manipulates the first adjusting means to move all of the guide members through the same distance, either toward or away from the axis of the workpiece, depending upon whether the diameter of the freshly finished workpiece is less than or exceeds the diameter of the previously treated workpieces.

The first guide means may comprise a composite sleeve one portion of which comprises a series of sectors each arranged to engage one of the guide members. The sleeve also comprises a second portion which is movable axially of the workpiece and is coupled with the sectors of the one portion by spindles or the like. Such spindles then constitute the second adjusting means.

If the second portion of the sleeve is moved axially, the spindles entrain the one portion and cause simultaneous adjustment in the position of all guide members. If the spindles are rotated individually, they can change the distance between the second portion and the respective sectors to thereby effect independentt adjustments of the respective guide members. Each guide member may be coupled to the respective sector by a claw or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawing the single illustration of which is a composite longitudinal section through a portion of a shaving machine embodying the improved work guiding and supporting apparatus.

Referring to the drawing in detail, there is shown a portion of a machine which is utilized to remove material from the exterior of elongated rod-shaped or tubular workpieces 8 which move lengthwise as indicated by an arrow A. The machine comprises a rotary shaving head 2 which constitutes a tool holder and supports one or more radially inwardly extending shaving tools or cutters 1. The head 2 is centered by a series of axially parallel pins 4 (only one shown) which extend into complementary bores provided therefor in the face of a hollow drive shaft 5. The means for connecting the head 2 to the drive shaft 5 comprises a series of bolts 3 which are articulately connected with the shaft 5 and mesh with nuts 3a, only one bolt and only one nut being actually shown in the drawing. The shaft 5 is rotatable in bearings 6 which are mounted in a stationary machine frame 7 and is provided with a ring gear 5a meshing with a pinion (not shown) which forms part of a suitable transmission.

The improved work guiding and supporting apparatus comprises a set of equidistant guide members G which are mounted on a stationary tubular support 12 adjacent to the shaving station and downstream of the cutter or cutters 1. The support 12 resembles a hollow cylinder which is coaxially received in the drive shaft 5 and defines a centrally located passage 12a in which the workpiece 8 moves lengthwise. Each guide member G comprises a holder or bracket 10 and a guide roll 9 which is rotatable on a pivot pin 9a carried by the respective bracket. The brackets 10 are rockable on pivot pins 11 which are mounted at the righthand end of the support 12 and whose axes are normal to and cross in space the axis of the workpiece 8 so that each guide roll 9 is rockable radially of the support toward and away from the center of the passage 12a, i.e., toward and away from the periphery of the shaved portion of the work-piece.

The apparatus further comprises a first adjusting unit which serves to simultaneously rock all of the guide members G about the axes of the respective pivot pins 11. This first adjusting unit comprises a composite sleeve including a rear portion 13 which surrounds the support 12 and a multi-sector front portion 13a. Each sector of the front portion 13a carries one of the pivot pins 11. The rear portion 13 is movable axially of the support 12 and is coupled with the sectors of the front portion 13a by a series of axially parallel displacing bolts or spindles 14 which together constitute a second adjusting unit capable of individually changing the angular positions of the respective brackets 10 and guide rolls 9. Each spindle 14 comprises an externally threaded front end portion 14a which is received in a tapped bore provided in the respective sector of the front portion 13a, and each spindle 14 also comprises two adjacent but spaced annular collars 14b which straddle an inwardly extending annular flange 13b of the rear portion 13 so that the spindles are compelled to share all axial movements of the rear portion 13 but cannot move axially with respect thereto. The flange 13b and collars 14b enable the spindles 14 to rotate with reference to the rear portion 13. The flange 13b may be replaced by a series of individual projections or lugs each of which extends into the space between two collars 14b.

The rear sleeve portion 13 is coupled to a nut 17 which is accommodated in a recess at the left-hand end of the support 12, and the coupling between the parts 13 and 17 comprises a series of bolts 16 each surrounded by a package of dished springs 15 which tend to move the rear portion 13 away from the nut 17, i.e., toward the shaving station which accommodates the cutter or cutters 1. Though the drawing shows a single bolt 16 and a single package 15, the apparatus preferably comprises an annulus of equidistant bolts 16. The external threads of the nut 17 mesh with internal threads provided on an annular worm wheel 18 which is received in the support 12 and can be rotated by a worm 19. The latter may be driven by a suitable servo, not shown. The parts 17–19 together constitute a shifting device which can move the sleeve 13, 13a axially to thereby effect simultaneous adjustments of all guide members G.

Each bracket 10 carries a stop 20, preferably assuming the form of a small roller, which abuts against the right-hand end face of the respective sector. The pins 21 of the rollers 20 are straddled by hooked claws 22 which are pivotably secured to the respective sectors and are biased by helical expansion springs 23. The parts 22, 23 constitute couplings which connect the brackets 10 with the front portion 13a, i.e., with the corresponding sectors of this front portion.

As stated before, the spindles 14 constitute a second adjusting unit which serves to change the angular position of individual guide members G, not only with reference to each other but also with reference to the support 12 and workpiece 8. The left-hand end portions 24 of the spindles 14 are of non-circular outline and are accessible through the nut 17 at the left-hand end of the support 12. When the spindles 14 are properly adjusted, their rear end portions 24 are engaged by complementary lock nuts 25 which are screwed (as at 25a) to an annular cap 26 serving to hold the worm wheel 18 against axial movement. The nuts 25 permit axial movements of spindles 14 with the rear portion 13 but prevent angular displacement of such spindles. In other words, the nuts 24 hold the sectors of the front portion 13a at a preselected distance from the rear portion 13. The pitch of intermeshing threads on the end portions 14a and in the sectors of the front portions 13a is such that the guide rolls 9 may be adjusted with utmost precision.

The operation of the illustrated machine is as follows:

In order to properly adjust the guide members G, the operator introduces a length of finished work through the central opening of the head 2 and into the space between the brackets 10. The finished length is properly centered and is held in such position while the operator starts the servo motor which drives the worm 19 in a sense to cause an axial displacement of the sleeve 13, 13a in a direction to the right, i.e., toward the shaving station. The support 12 is stationary and each bracket 10 is rockable on its pivot pin 11. Therefore, and as the sleeve 13, 13a moves to the right, the claws 22 rock the guide members G in a sense to move the guide rolls 9 toward the center of the passage 12a and into engagement with the peripheral surface of the finished length of the workpiece. The worm 19 is arrested when at least one guide roll 9 engages the workpiece. If one or more rolls 9 fail to actually engage the workpiece, the operator removes the respective nuts 25 and utilizes a tool to rotate the rear ends 24 of the spindles 14 so as to shift the corresponding sectors of the front portion 13a toward the brackets 10 whereby the claws 22 again rock the guide rolls 9 toward the periphery of the workpiece. In this way, all of the guide rolls 9 may be placed in proper engagement with the workpiece because the sectors of the front portion 13a are movable individually in response to rotation of the spindles 14. Once the operator completes the adjustment of all guide rolls 9, the nuts 25 are again connected to the cap 26 and the machine is ready for operation.

Of course, when the guide rolls 9 are properly adjusted so that their work-engaging peripheral surfaces are equidistant from the axis of the support 12, any further adjustments of the guide members G may be carried out simultaneously by rotating the worm 19. Such simultaneous adjustments will be necessary if the machine is converted for shaving of differently dimensioned workpieces. The spindles 14 will be rotated to effect such adjustments which are necessary to compensate for different wear on the work-engaging peripheral surfaces of the guide rolls 9, to compensate for wear of pivots 9a and 11, and/or to compensate for differences in diameters of rolls 9 if all such rolls are not produced with the same degree of precision.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, there-

What is claimed as new and desired to be protected by Letters Patent is:

1. In a material removing machine, particularly in a machine for shaving the exterior of elongated workpieces which travel lengthwise, a support; a plurality of guide members mounted on said support and movable toward and from the periphery of a travelling workpiece; first adjusting means for simultaneously moving all of said guide members with reference to said support and in the same direction, said first adjusting means comprising a sleeve surrounding said support and including a first portion comprising a plurality of sectors each engaging one of said guide members, a second portion coupled with said first portion, and shifting means for moving said sleeve axially to thereby move said guide member substantially radially of said support; and second adjusting means for individually moving said guide members with reference to each other and with reference to said support, said second adjusting means comprising displacing devices for moving said sectors with reference to each other in the axial direction of said sleeve.

2. A structure as set forth in claim 1, wherein each of said displacing devices comprises a threaded spindle rotatable relative to said second portion and meshing with the respective sector so that rotation of such spindle causes movement of the respective sector with reference to said second portion, said spindles being parallel with the axis of said sleeve.

3. A structure as set forth in claim 2, wherein each of said spindles has a non-circular end portion remote from the respective sector and adapted to be engaged by a torque transmitting tool, each of said spindles further having a pair of collars and said second portion having flange means received between such collars to hold said spindles against axial movement with reference to said second portion.

4. A structure as set forth in claim 1, wherein each of said guide members is pivotable with reference to said support about an axis which is normal to and crosses in space the axis of the workpiece so that said guide members are movable radially of said support.

5. A structure as set forth in claim 4, wherein each of said guide members comprises a work-engaging roll and a holder for such roll, said holders being pivotable with reference to said support.

6. A structure as set forth in claim 1, further comprising a rotary tool holder having cutter means located upstream of said guide members as seen in the direction of travel of workpieces, and drive means for rotating said tool holder about the axis of a traveling workpiece.

7. In a material removing machine, particularly in a machine for shaving the exterior of elongated workpieces which travel lengthwise, a support in form of a fixed cylinder; a plurality of guide members pivotally secured to said cylinder for movement toward and away from the axis thereof; first adjusting means for simultaneously moving all of said guide members relative to said axis, said first adjusting means comprising an axially movable sleeve surrounding said cylinder and having relative movable portions each engaging one of said guide members, and shifting means for moving said sleeve axially; and second adjusting means for individually moving said guide members with reference to each other and with reference to said axis and comprising displacing devices for moving said portions independently of each other in the axial direction of said cylinder.

8. A structure as set forth in claim 7, wherein said shifting means comprises a worm and worm wheel assembly.

9. In a machine tool, in combination, a stationary support defining a path for a travelling workpiece; a plurality of guide members mounted on said stationary support on different sides of said path movable in direction toward and away from the latter; a plurality of engaging means, one for each of said guide members, for moving each of said guide members toward and away from said path; first adjusting means for simultaneously adjusting all of said guide members with reference to said path, said first adjusting means comprising a member mounted on said stationary support movable in direction of said path, adjustable coupling means for adjustably coupling each of said engaging means to said member, and shifting means for shifting said member in direction of said path so as to simultaneously adjust the position of said guide members by simultaneously moving all of said engaging means; and second adjusting means for individually moving said guide members with reference to each other and with reference to said path, said second adjusting means comprising means for adjusting each of said coupling means separately from the others so as to separately adjust the position of a selected one of said guide members.

10. A structure as set forth in claim 9, wherein said second adjusting means cooperates with said adjustable coupling means and said engaging means to adjust the position of the latter in direction of said path relative to said member.

11. A structure as set forth in claim 10, wherein said member is a sleeve surrounding said path.

12. A structure as set forth in claim 11, wherein said plurality of engaging means are circumferentially arranged in the region of a front end portion of said sleeve.

References Cited

UNITED STATES PATENTS

| 1,646,758 | 10/1927 | Matthews | 82—20 XR |
| 2,328,002 | 8/1943 | Gall et al. | 82—20 |

FOREIGN PATENTS

| 1,260,356 | 3/1961 | France. |

LEONIDAS VLACHOS, *Primary Examiner.*

U.S. Cl. X.R.

82—38